United States Patent [19]

Alessio

[11] Patent Number: 4,523,504
[45] Date of Patent: Jun. 18, 1985

[54] PORTABLE MACHINE TOOL HAVING AN OPERATING UNIT MOUNTED ON A COLUMN

[75] Inventor: Lorenzo E. Alessio, Lecco, Italy

[73] Assignee: Black & Decker Inc., Newark, Del.

[21] Appl. No.: 554,284

[22] Filed: Nov. 22, 1983

[30] Foreign Application Priority Data

Nov. 30, 1982 [IT] Italy .............................. 23584/82[U]

[51] Int. Cl.³ .............................................. B27B 5/20
[52] U.S. Cl. .................................. 83/471.3; 83/477.1; 83/859; 144/1 C
[58] Field of Search ...................... 83/471.3, 574, 477.1, 83/473, 859, 701; 144/1 C, 1 R

[56] References Cited

U.S. PATENT DOCUMENTS

| | | | |
|---|---|---|---|
| 1,549,818 | 8/1925 | Torlinski | 83/471.3 |
| 2,656,861 | 10/1953 | Verret | 83/471.3 X |
| 3,465,793 | 9/1969 | Zuk | 83/477.2 X |
| 3,586,079 | 6/1971 | Collins, Sr. et al. | 83/471.3 X |
| 3,931,751 | 1/1976 | Simonson | 83/859 |
| 4,318,432 | 3/1982 | Howey | 144/1 C |
| 4,405,003 | 9/1983 | Watson et al. | 144/1 C X |

Primary Examiner—Frank T. Yost
Attorney, Agent, or Firm—Ronald B. Sherer; Edward D. Murphy; Harold Weinstein

[57] ABSTRACT

A portable machine tool, comprising a base structure, a work surface supported by the base structure for supporting, in use, a workpiece, and a column pivotally connected to the base structure and being pivotal between an upstanding operative position in which the column extends upwardly above the work surface and a lateral inoperative position. An operating unit is attached to the column and is supported thereby above the work surface in the operative upstanding position for operating, in use, on the workpiece. A locking arrangement releasably secures the column in the operative upstanding position. Preferably the column is pivoted behind and to the rear of the base structure, and a part of the work surface is removable to expose a space inside the base structure in which the operating unit is at least partially housed when the column is pivoted to the inoperative lateral position. In this way the machine tool, which is preferably a radial arm saw, is made more compact for transporting and/or storage.

14 Claims, 11 Drawing Figures

PORTABLE MACHINE TOOL HAVING AN OPERATING UNIT MOUNTED ON A COLUMN

FIELD OF THE INVENTION

The present invention relates to a portable machine tools having an operating unit mounted on a column, and is particularly applicable to radial arm saws and the like.

BACKGROUND OF THE INVENTION

Portable and/or transportable machine tools are known in which an operating unit is mounted on a column which extends upwardly from a base structure having a work surface.

Because of their bulk, such machine tools are difficult to transport and relocate, and also give rise to considerable storage problems. Machine tools such as radial arm saws could have greater application if they could be readily transported from one job site to another.

With some such machine tools, it is possible to dismantle and remove the operating unit and the column in order to reduce the bulk of the machine tool for transportation and storage. However, such dismantling, and subsequent re-mounting, of the operating unit and the column is time consuming, requires a certain level of skill, and can adversely affect the performance of the machine tool if performed carelessly or unskillfully. Moreover, the removed operating unit and column then have to be individually stored or housed safely and with care.

SUMMARY OF THE INVENTION

It is an object of the present invention to provide such machine tools which are more readily transportable and storable without the need to remove either the column or the operating unit.

A feature by which this object is achieved is by pivotally mounting the column on the base structure of the machine tool, so that the column can be pivoted downwardly from an upstanding operative position to a lateral inoperative position. This provides the advantage that for transporting and storing, the machine tool is reduced in height without removal of the column. Further, when prepared for transportation in this way, the machine tool is easy to handle and, if desired, can be readily carried by a handle specially provided for that purpose.

Another feature of the present invention, by which such machine tools are rendered more compact for transportation and storage, is having part of the work surface readily removable to expose a space inside the base structure, and allowing at least part of the operating unit to enter and be housed in this space as the column is pivoted downwards to its lateral inoperative position. This has the advantage that a bulky operating unit can be automatically housed for transportation and storage without substantially increasing the bulk of the collapsed machine tool. An electric motor forming part of the operating unit of a radial arm saw can advantageously be accommodated in this way.

Accordingly, therefore, there is provided by the present invention a portable machine tool having a column upstanding from a base structure having mounted thereon a work surface, and an operating unit supported by the column above the work surface for operating, in use, on a workpiece positioned on the work surface, wherein the column is pivotally connected to the base structure and is pivotal between an upstanding operative position and a lateral inoperative position, means being provided for releasably securing the column in the upstanding operative position.

Preferably, the column is disposed behind and pivoted to the rear of the base structure, and in the lateral inoperative position the column extends behind and along the rear of the base structure. The column may have an arm extending perpendicularly therefrom with the operating unit movable mounted on this arm. In the lateral inoperative position of the column, the arm may extend along and outside a side of the base structure, preferably the column and the arm then lying in a horizontal plane parallel to the work surface with at least part of the operating unit entering in a space provided therefor in the base structure.

Preferably, a removable part of the work surface may comprise a plurality of slats, and means be provided for temporarily storing the removed slats under the work surface. The slats, when removed, expose the space in the base structure for housing the operating unit.

The present invention is particularly applicable to radial arm saws to render them more readily transportable and storable and so increase the situations in which they can be used.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
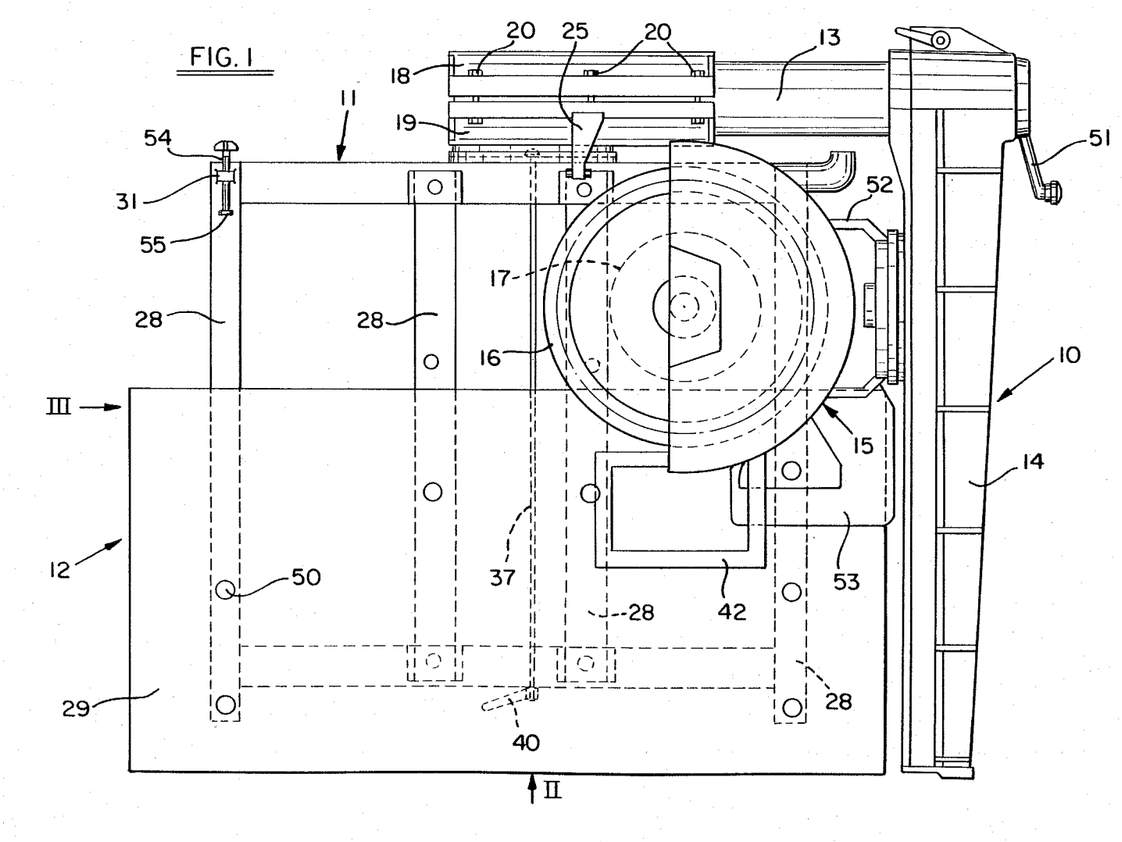
FIG. 1 is a diagrammatic top plan view of a radial arm saw according to the present invention in a folded position ready for transportation and/or storage.
Figure 2:
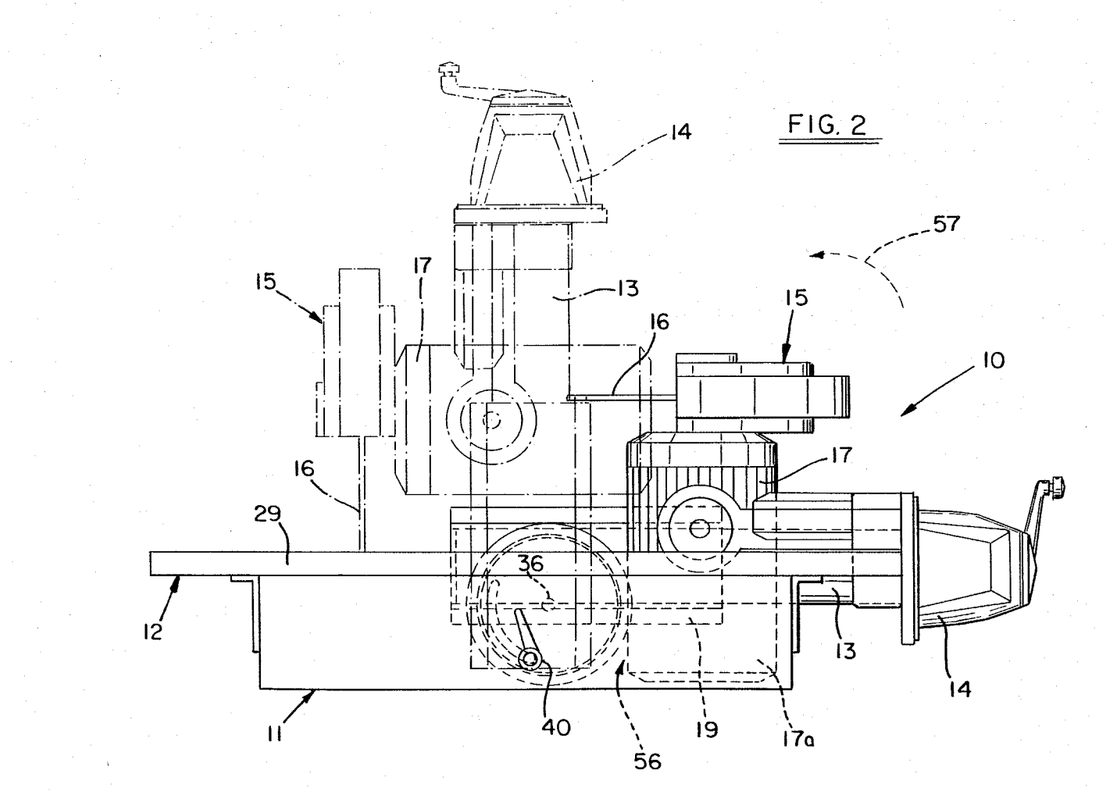
FIG. 2 is a diagrammatic front elevation in the direction of the arrow II of FIG. 1, and in which the chain lines indicate the radial arm saw in the unfolded, erected position ready for use.
Figure 3:
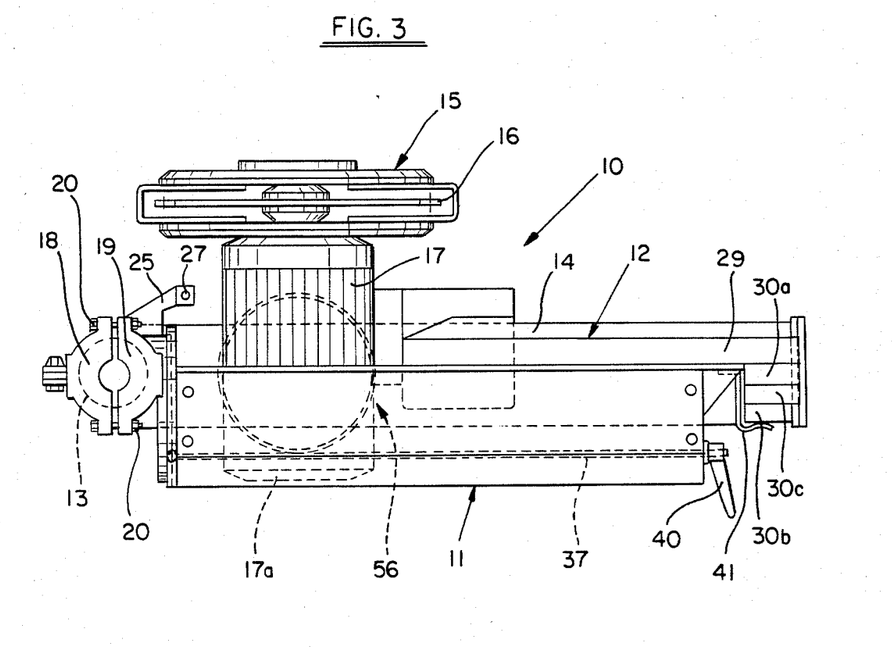
FIG. 3 is a diagrammatic elevation in the direction of the arrow III of FIG. 1.

FIGS. 1, 2 and 3 show a preferred embodiment of the invention, a portable radial arm saw, in a folded position ready for transportation and/or storage, FIG. 1 being a top plan view, FIG. 2 a front view, and FIG. 3 a side view. In FIG. 2, the chain lines shows the radial arm saw erected and ready for use. The radial arm saw is designated generally by the reference numeral 10 and has a base frame 11 upon which is mounted a working surface 12.

Turning to FIG. 1, only a portion 29 of the wooden table comprising the working surface 12 can be seen, the other portion of the working surface 12 having been removed and stored in the portable power tool out of sight. The metal frame 11 has four parallel, spaced apart cross pieces 28 to which the table portion 29 is secured by a plurality of bolts 50, the heads of which are located in counter sunk bores below the working surface of the table portion 29. A column 13 is telescopically retained in a two part sleeve 18, 19, with bolts 20 securing the two parts 18 and 19 together. The two part sleeve 18, 19 is pivotally attached to the base frame 11, as will be described more fully later. Mounted on the distal end of the column 13 is an over hanging radial arm 14. In use, the radial position of the arm 14 relative to the central longitudinal axis of the column 13 can be adjusted by releasing the hand lever 51 and then retightening it in the selected radial position of the arm 14. An operating saw unit 15, having a circular saw blade 16 drivably mounted on an electric motor 17, is attached by a bracket 52 to the radial arm 14. As is well known in the art, in use, the bracket 52 is slidable in either direction along the length of the radial arm 14. Also, as is well known in the art, the circular saw blade 16 is covered over a substantial part of its periphery by a guard, as can be seen. The operating unit has a handle 53 by which, in use, it can be moved backwards and forwards along the radial arm 14. A bracket 25 extending from one side of the sleeve part 19 functions to locate and retain the sleeve 18, 19 in the upright position in use, as will be described more fully later. Also, a rod 37, extending from the rear of the frame 11 to the front thereof and having a clamping handle 40, is also employed to lock the column in the upright position in use, as will be described more fully later. A pair of brackets 31 (only one of which can be seen in FIG. 1) extend upwardly from the rear of the base frame 11, and have threadedly engaged therethrough clamping screws 54 having disk-like clamping ends 55 for securing in position, in use, the removed portion of the wooden table making up the complete working surface 12.

Figure 4:
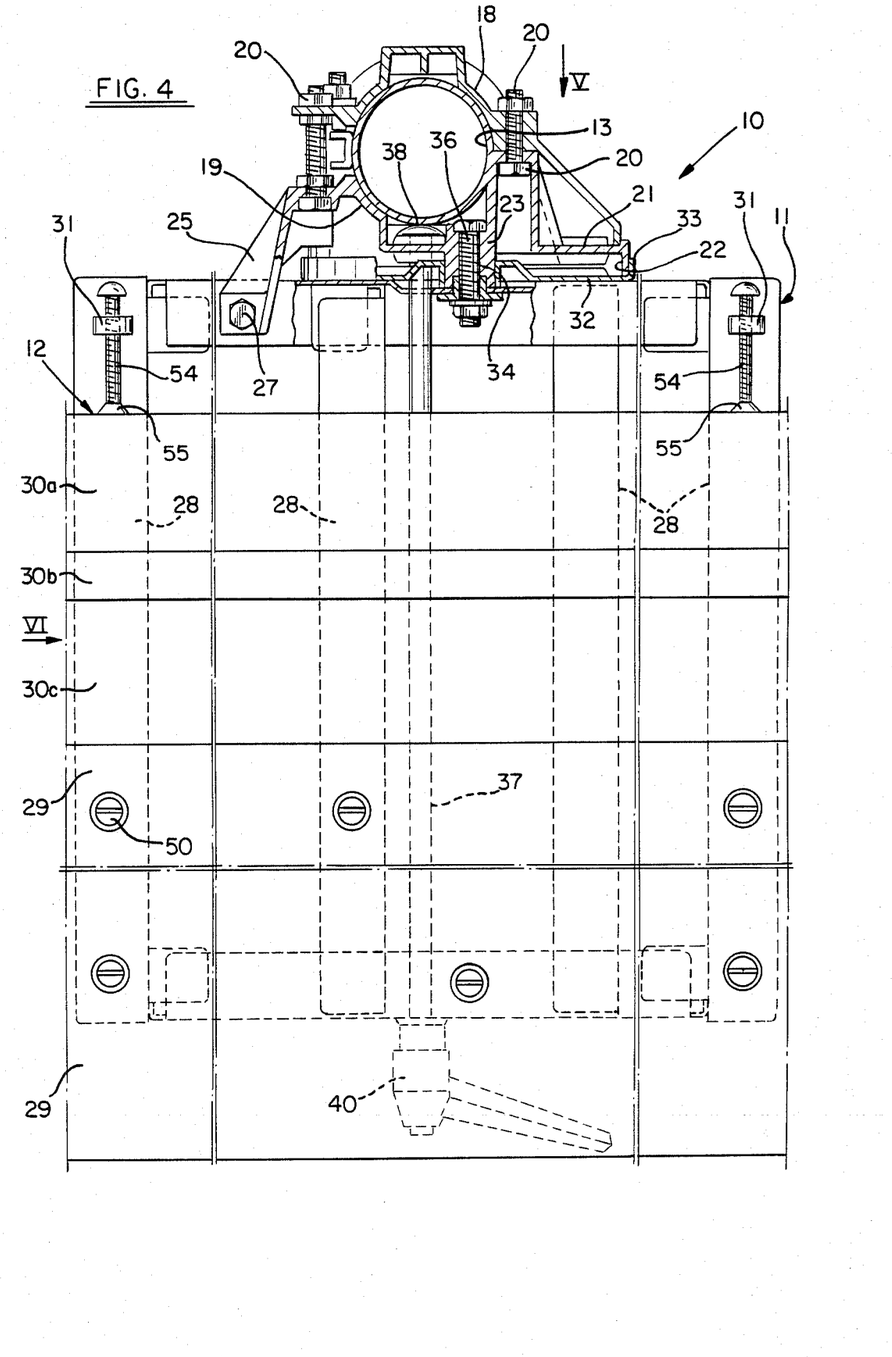
FIG. 4 is a top plan view, on a larger scale, of the radial arm saw in the erected position, this view being partially in section and having portions omitted to reduce the width and height of the figure.
Figure 5:
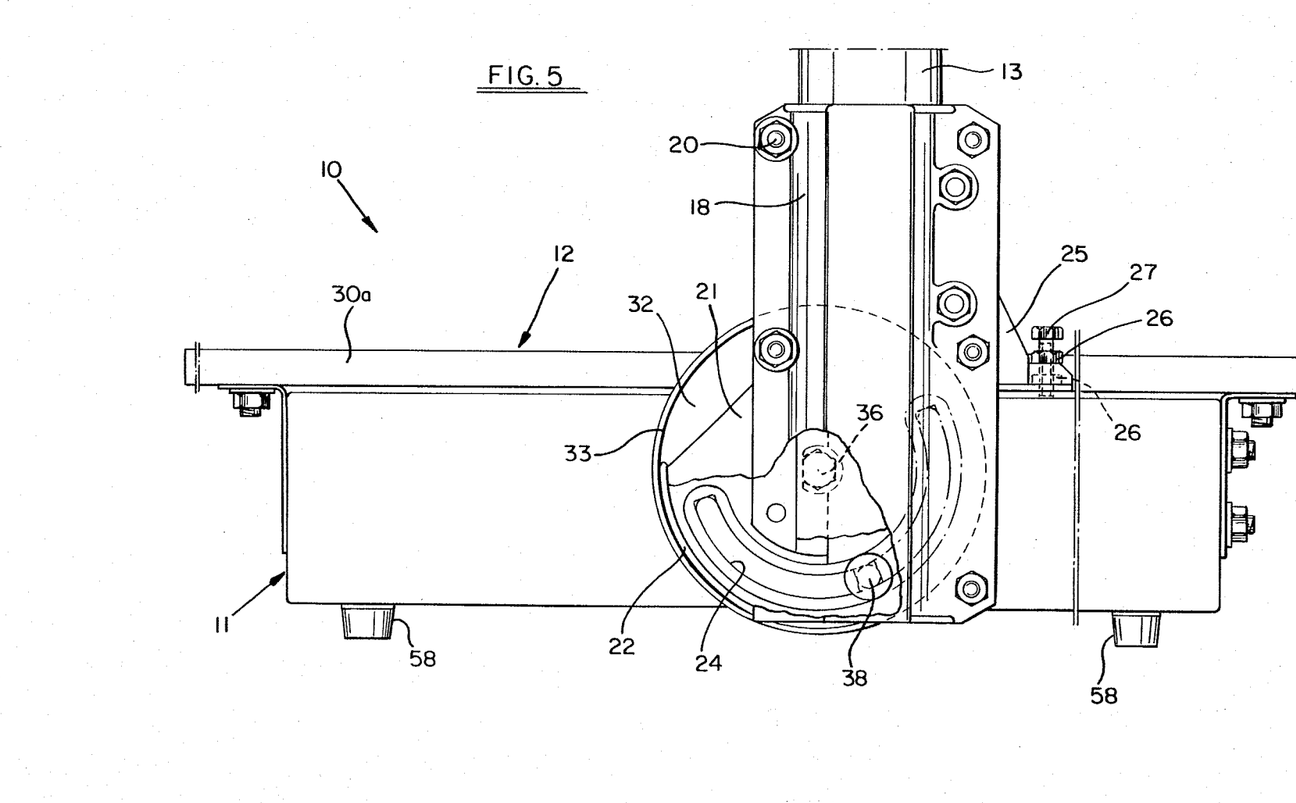
FIG. 5 is an elevational view in the direction of the arrow V of FIG. 4, with a portion broken away and other portions omitted to reduce the width of the figure.
Figure 6:
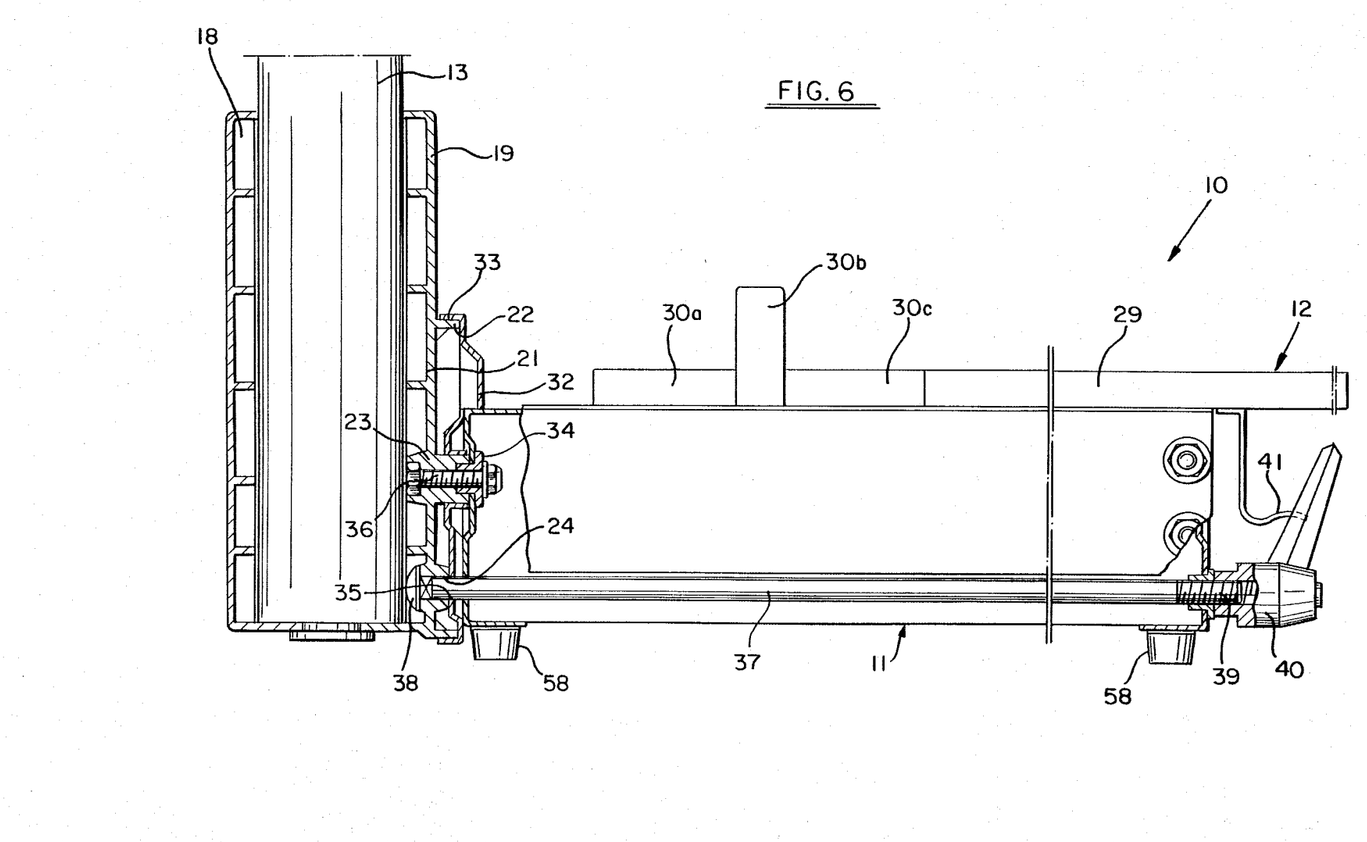
FIG. 6 is a view in the direction of the arrow VI of FIG. 4, partially in elevation and partially in section with portions omitted to reduce the width of the figure.

FIGS. 2 and 3 show an end portion 17a of the motor 17 accommodated in a cavity 56 in the base frame 11. This cavity extends between two cross pieces 28 of the frame (see FIG. 1). The radial arm 14 can be seen lying adjacent and along one side of the fixed table portion 29, and as can be appreciated from FIGS. 1, 2 and 3, in the folded position of the radial arm saw, the column 13 and the radial arm 14 at right angles thereto lie approximately in the plane of the working surface 12. FIG. 3 shows three wooden slats 30a, 30c, and 30b, which in use are employed to complete the working surface 12, stored beneath the forward edge of the wooden table portion 29 and held in position by resilient clips 41. FIG. 2 shows in broken lines a pivot 36 about which the column 13, radial arm 14, and saw unit 15 are pivoted in the direction of the arrow 57 to erect the radial arm saw ready for use to the position shown in chain lines. In the erected position, as can be seen, the column 13 is vertical and the circular saw blade 16 is positioned in a vertical plane immediately above the working surface 12. FIGS. 4, 5 and 6 are views showing the column 13 secured in the vertical position with the radial arm saw ready for use. In these Figs., portions of the power tool between parallel chain lines have been omitted, as is well known, to reduce the size of the Figs.

FIG. 4 shows the wooden table portion 29 secured to the cross members 28 by the screws 50, and the remaining portion of the working surface 12 completed by the wooden slats 30a, 30b and 30c. After the column 19 has been erected to a vertical position, the slats 30a, 30b, 30c are placed across the cross members 28 and releasably secured in position by tightening the clamping screws 54, to clamp the slats against the rear edge of the table portion 29. The tubular column 13 can be seen clamped between the two sleeve parts 18 and 19 by the bolts 20. The bracket 25 extending from one side of the sleeve part 19 is located against base frame 11 by a bolt 27 to automatically position sleeve 19, 20 and column 13 in the correct vertical position. FIGS. 4, 5 and 6 together show the pivotal attachment of the sleeve 18, 19 and column 13 to the base frame 11. A circular disk-like plate 32 is rigidly secured to the rear portion of the base frame 11. The plate 32 has an outwardly extending cylindrical flange 33 and a central boss having a central bore 34. The sleeve part 19 has attached thereto and integrally formed therewith a second disk-like plate 21 also having an out-turned cylindrical-like flange 22. The disk 21, which is not completely circular as can be seen in FIG. 5, has a central hub 23 having a bore therethrough, and a concentric arcuate slot 24 (seen exposed in FIG. 5). The partly circular plate 21 is rotatably nested inside the flange 33 of the plate 32, and pivotally attached thereto by a bolt 36 passing through the central boss 23 and the central bore 34 (see particularly FIG. 6). The long screw threaded rod 37 has a locking head 38 at its rear end which engages in the arcuate slot 24, the rod 37 passing forwardly through a second bore 35 in the lower portion of the fixed plate 32 in alignment with the arcuate slot 24 (see FIG. 6). The forward threaded end of the rod 37 extends forwardly of the base frame 11 and is adapted to receive the clamping handle 40 which is also internally bored and threaded. By tightening the clamping handle 40, the partially circular plate 21 is clamped inwardly against the fixed plate 33 and secured against rotation relative thereto. Extending downwardly from the base 11 are four feet 58, preferably made of firm resilient material, upon which the portable power tool can be supported on any convenient surface, such as a work bench.

As can be seen in FIG. 6, the slat 30b, which is slightly narrower than the other two slats 30a and 30c, is clamped on its edge between the slats 30a and 30c in order to form a back stop for any work piece being cut by the circular saw blade 16. FIG. 6 also more clearly shows the resilient clip 41 secured to the lower surface of the table portion 29, adjacent the forward edge thereof, for releasably securing the slats 30a, 30b and 30c in their stored position.

In operation, the portable radial arm saw is supported on a bench top, or the like, by the four feet 58, the column 13 is located in the upright position by the bolt 27, locked in that position by the clamping handle 40, and the removable wooden slats 30a, 30b, and 30c are clamped in the position shown in FIGS. 4 and 6 by the clamping screws 54 to complete the working surface 12. An operator positions a work piece against the back stop formed by the upstanding slat 30b, holds an end of the work piece with one hand, and then grasping the handle 53 with the other hand, actuates the motor 17 and draws the operating unit 15 forwardly along the over hanging radial arm 14 to cut the work piece. When it is desired to dismantle, i.e. fold-up, the portable radial arm saw for transportation and/or storage, first the saw unit 15 is moved rearwardly on the arm 15 until it is positioned as shown in FIG. 1 as close as possible to the column 13, then the electrical connection (not shown) is disconnected, the clamping bolts 54 loosened and the wooden slats 30a, 30b, and 30c removed and stored below the table portion 29 in the resilient brackets 41. In such storage position, the slats are secured out of the way. The clamping handle 40 is loosened to un-clamp the plate 21 from the fixed plate 32, and then the sleeve 19, 20, column 13, radial arm 14, and operating unit 15 are pivoted as a unit about the pivot 36 until the column 13 and the radial arm 14 lie in approximately the plane of the working surface 12 along and adjacent to adjacents sides thereof. During this pivoting action, the motor 17 enters into, and is accommodated by, the space 56 in the base frame between the rear edge of the table portion 29 and two adjacent cross members 28, access to this space 56 being made possible by the removal of the portion of the working surface 12 formed by the three slats 30a, 30b and 30c. The folded column 13 and radial arm 14 are secured in the horizontal position by re-tightening the clamping handle 40 and clamping the movable plate 21 against the fixed plate 32. To carry the collapsed radial arm saw a pivoted carrying handle 42 is provided, as schematically shown in FIG. 1. During the pivoting of the column 13 through 90° degrees, the rod 37 sliding in the arcuate slot 24 helps guide the rotation of the plate 21 relative to the fixed plate 32.

From the foregoing, it will be appreciated that a machine tool according to the present invention, with an operating unit mounted on a pivotal column which can be lowered laterally with respect to the work surface, is readily rendered transportable, or operative, without having to remove, or assemble, parts of the operating unit. Moreover, the overall dimensions of the portable machine tool are compact, enabling the folded machine tool to be effectively portable. Further, the folded machine tool when packaged is compact, and storage in a minimum of space is possible.

Figure 7:
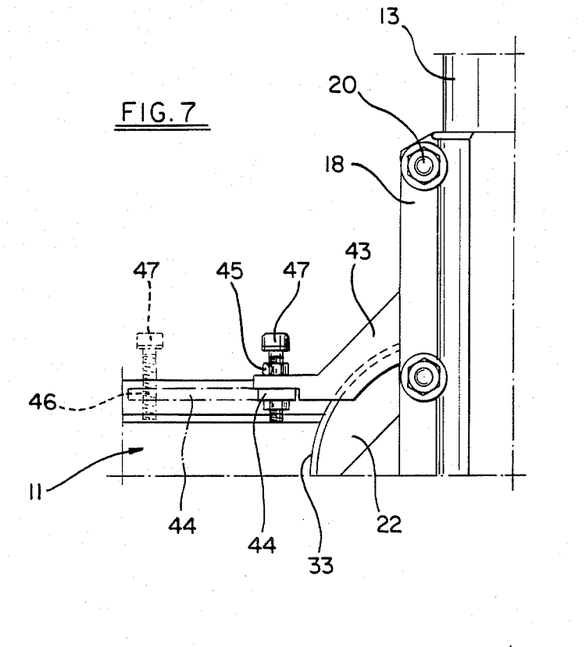
FIG. 7 is a detail in rear elevation in the direction of the arrow V in FIG. 4 of an optional bracket for locking the column of the radial arm saw of FIGS. 1 to 6 in a vertical position.
Figure 8:
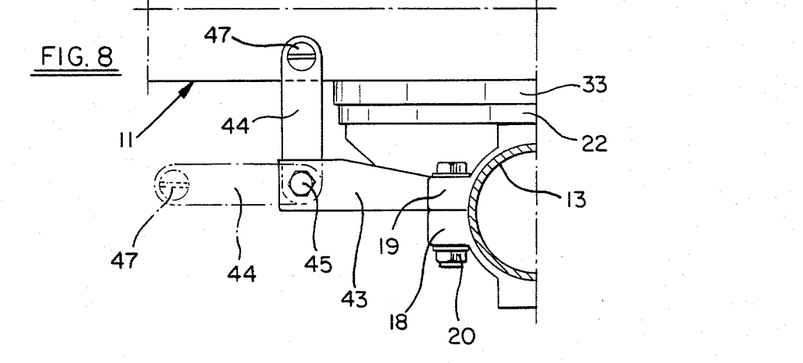
FIG. 8 is a plan view of the detail of FIG. 7.

FIGS. 7 and 8 show a modification of the radial arm saw of FIGS. 1 through 6. A second securing bracket 43 is attached to the sleeve part 19 on the opposite side thereof to the bracket 25. The bracket 43 extends outwardly from one side of the sleeve part 19, and has a link 44 pivotally attached to its extending end by a bolt 45. The distal end of the link 44 is secured to the base frame 11 by a screw 47. Thus, the column 13 is securely retained in the vertical position, for the normal functioning of the operating unit 15, by both this second bracket 43 and the bracket 25, these two brackets being on opposite sides of the column 13. With this modification, the rod 37 and locking handle 40 may be dispensed with if desired. To pivot and lower the column 13, the bolt 47 is loosened to then disengage the link 44 which is pivoted to the position shown in chain lines in FIGS. 7 and 8 to enable the link 44 to pass downwardly behind the rear of the base frame 11 as the column 13 is pivoted downwardly.

A locking system of this kind can be modified to allow the column 13 to be stably positioned in an inclined position, that is between the vertical and horizontal positions. This can be achieved in combination with the locking rod 37, or with other locking means, acting to releasably clamp the plates 21 and 32 together, for example a screw with a wing nut. Also, the screw 27 may be provided with locking nuts 26, which can be seen in FIG. 5, to enable the position of the screw through the bracket 25 to be adjusted; the screw 27 can then function simply as an adjustable stop engaging the base frame 11, and with this arrangement it is also possible to adjustably position the column 13 in an inclined position relative to the working surface 12, the column being locked in the inclined position by the securing rod 37 or other securing means.

Figure 9:
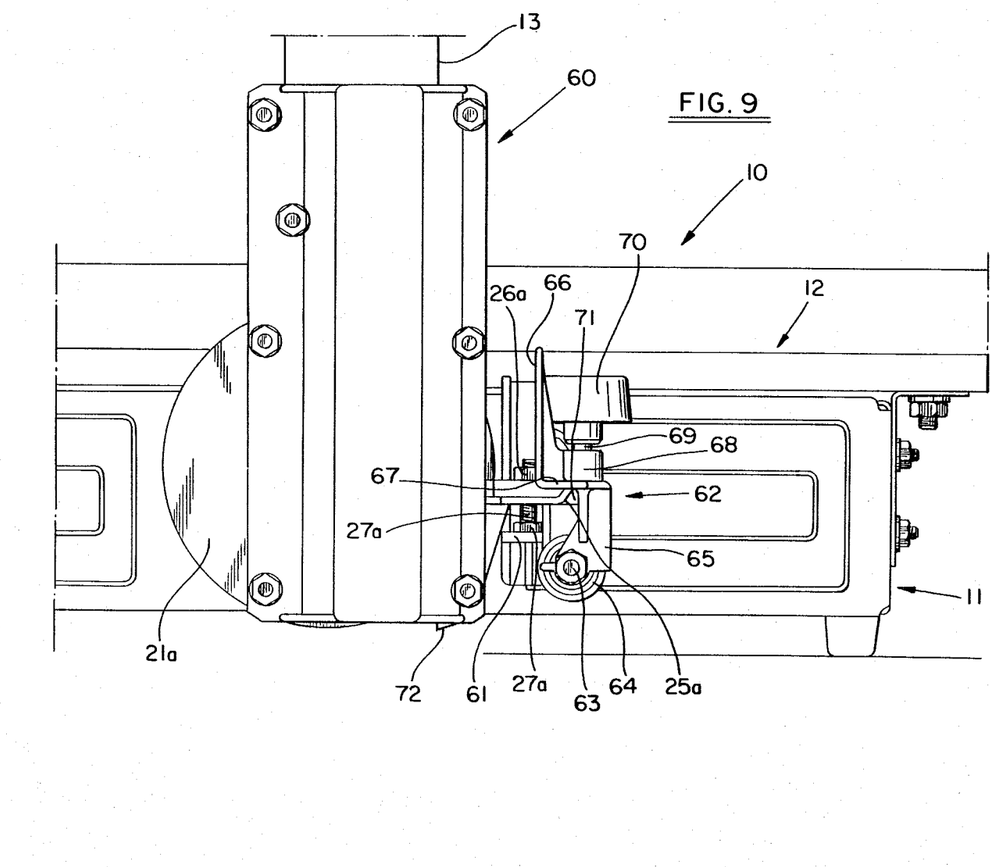
FIG. 9 is a rear elevational view, similar to FIG. 5, of a modification of the column locking arrangement of the radial arm saw of FIGS. 1 to 6.
Figure 10:
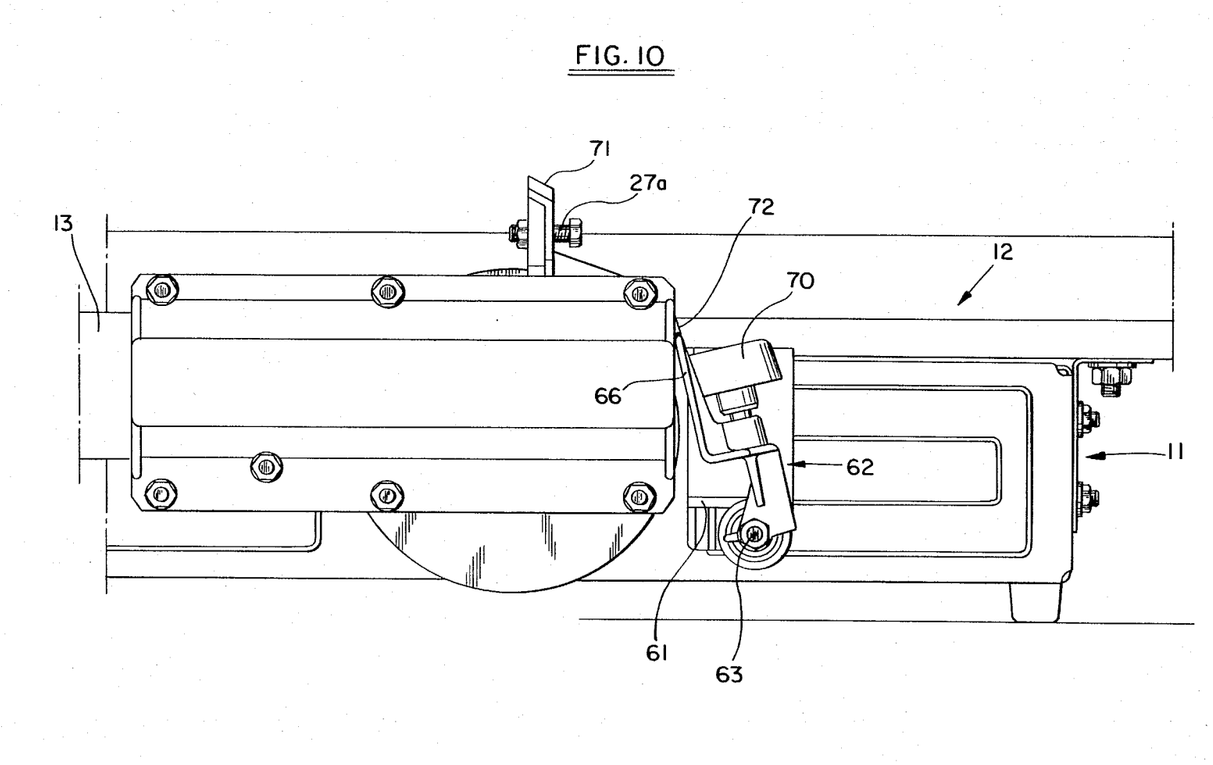
FIG. 10 is the same view as FIG. 9 but with the column pivoted horizontally.
Figure 11:
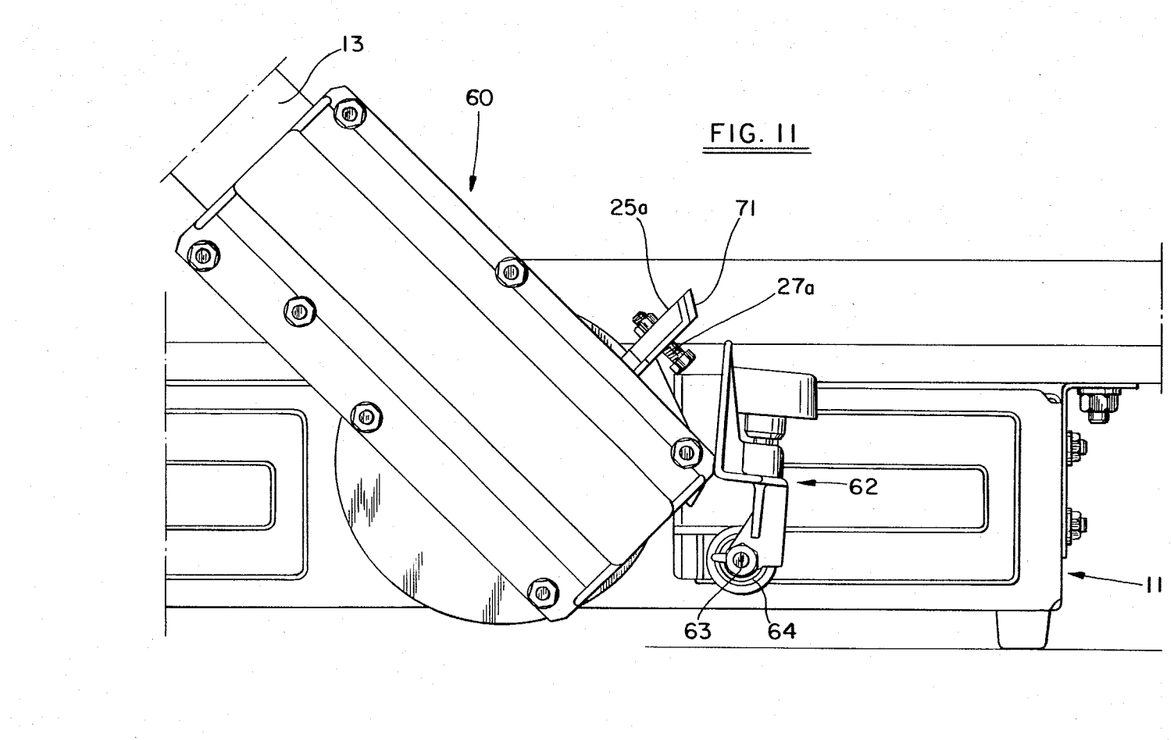
FIG. 11 is the same view as FIG. 9 but with the column in an intermediate pivotal position.

FIGS. 9, 10 and 11 show a preferred modification of the arrangement for locking the column 13 is position in the radial arm saw of FIGS. 1 to 6, and only the essential differences of this embodiment from the embodiment of FIGS. 1 to 6 will be described.

The locking rod 37, and the clamping handle 40 are omitted, together with the arcuate slot 24. The pivot plate 21a secured to and pivotal with the two part, flanged column socket 60 is completely circular. The location bracket 25a extends from the side of the column socket 60 at a location nearer the lower end thereof. A bolt 27a is screwed through the bracket 25a and adjustably secured in position by a lock nut 26a. The head of the bolt 27a abuts against another bracket 61, extending rearwardly from the base structure 11, to locate the column in the vertical operative position. Adjacent the bracket 61, a latch 62 is pivotally attached by a pivot bolt 63 to the rear of the base structure 11. The latch 62 is resiliently biased towards the socket 60, i.e. anti-clockwise about the pivot 63 in FIGS. 9, 10 and 11, by a spiral spring 64 mounted around the pivot 63. The latch 62 has a lower channel part 65, which stradles the spring 64, and a generally parallel upper part 66. The parts 65 and 66 are connected by a transverse platform 67 upwardly from which extends a screw-threaded socket 68 through which engages a screw 69 having a wing-like knob 70 at its upper end. The outer end of the bracket 25a has a small extension 71 which contains a screw-threaded socket (not shown). The lower end of the column socket 60 has a small detent 72 extending from the bottom thereof.

In the vertical operative position of the column 13, shown in FIG. 9, the platform 67 of the latch 60, urged by the spring 64, engages over the bracket 25a and locks the column 50 in position. Also, the wing-like knob 70 is manually turned to engage the screw 69 in the socket (not shown) in the extension 71 of the column bracket 25a to positively lock the latch 62 in its retaining position, the extension 71 being accommodated between the walls of the channel part 65.

To pivot the column 13 to its horizontal inoperative position, the screw 69 is released from the bracket 25a using the knob 70, and the latch 60 manually pivoted anti-clockwise, against the action of the spring 64, to disengage the latch from the bracket 25a. Whereupon the column is manually pivoted anti-clockwise to the inoperative position shown in FIG. 10. In this position, the spring-loaded latch 62 is biased to engage under the detent 72 and releasably lock the column 13 in the horizontal position for transportation and/or storage.

FIG. 11 shows the column in an intermediate position when being pivoted from the inoperative position to the operative position or vice versa. During such pivoting, the latch 62 is spring-biased against the lower end of the socket 60 of the column 13, with relative sliding motion occuring between the two. Whenever the column reaches either the vertical or horizontal position, the latch 62 automatically engages the bracket 25a or the detent 72 to lock the column in place.

The second securing bracket 43 of FIGS. 7 and 8 may also be incorporated in the embodiment of FIGS. 9 to 11 for further locking of the column in the vertical operative position, if desired.

As will be appreciated, the inventory principle of the present invention is clearly also applicable to other columned machine tools to render them more readily portable and/or storable, for example power miter box units.

The above described embodiments, of course, are not to be construed as limiting the breadth of the present invention. Modifications, and other alternative constructions, will be apparent which are within the spirit and scope of the invention as defined in the appended claims.

For example, the bolt 27 or 27a may be freely rotatable in the locating bracket 25 or 25a and threadingly engage a socket in the back member of the frame structure or a part thereof, thereby securing the column 13 in the vertical position. In this case the bracket 25 or 25a could engage directly on the frame structure or a part thereof to first locate the column in this position.

What is claimed is:

1. A portable radial arm saw, comprising:
   a base frame having a rear and a front;
   a work surface supported by said base frame, said work surface comprising a front portion fixed to said base frame, and a rear portion removably held in place by releasable clamps;
   a column having one end telescopically secured within a two part sleeve, the two parts of the sleeve being clamped together;
   one of the parts of said sleeve having a first pivot plate rigidly secured thereto, said plate having therein a central bore and an arcuate slot concentric with said bore;
   a second pivot plate mounted on the rear of said base frame and with which said first pivot plate cooperates;
   a pivot engaged through said bore and pivotally connecting said first plate to said second plate, whereby said column is pivotally attached to said base frame said column being pivotal between an upright operative position in which the column extends upwardly above said work surface and a lateral inoperative position in which the column extends along and behind the rear of said base frame;
   a bracket attached to said one of said sleeve parts for locating said column in a vertical upright position;
   a rod engaged through said arcuate slot for releasably securing said column in any selected pivotal position;
   an arm extending transversely from the other end of said column and having a circular saw unit slidably suspended therefrom, said unit including an electric motor; and
   said base frame having a space therein below said removable rear portion, said motor entering and being at least partially housed in said space when said rear portion of said work surface is removed and said column pivoted to said lateral inoperative position.

2. The portable radial arm saw of claim 1, further comprising a second bracket attached to said one of said sleeve parts for securing said column in said vertical upright position in conjunction with said locating bracket, said locating and second brackets being disposed on opposite sides of said column.

3. The portable radial arm saw of claim 1, comprising means for releasably connecting said rear portion of said work surface to said base frame in a stored location when removed from said work surface.

4. The portable radial arm saw of claim 3, wherein said connecting means comprises a resilient clip.

5. The portable radial arm saw of claim 3, wherein said rear portion of said work surface comprises a plurality of slats.

6. The portable radial arm saw of claim 5, wherein one of said slats extends above said table portion, in use, to form a back-stop for a workpiece to be cut by said saw unit.

7. The portable radial arm saw of claim 1, wherein said rod extends from the rear to the front of said base frame below said working surface, said rod having a screw-threaded portion extending beyond the front of said base frame and having a handle screw-threadedly mounted thereon.

8. The portable radial arm saw of claim 1, wherein said base frame has feet for supporting the radial arm saw on a bench top, and in said lateral inoperative position of said column said arm is located along and outside a side of said base frame, said side extending from said rear to said front of said base frame.

9. A portable radial arm saw or the like, comprising:
   a base structure;
   a work surface supported by the base structure for supporting, in use, a workpiece;
   a column pivotally connected to said base structure, and being pivotal between an upstanding operative position in which said column extends upwardly above said work surface and a lateral inoperative position, said column having a bottom which faces downwardly when said column is in said upstanding operative position and laterally when said column is in said lateral inoperative position;
   a circular saw unit attached to said column and being supported thereby above said work surface in said operative upstanding position for operating, in use, on the workpiece;
   locating means, connected to said column and engageable with said base structure, for locating said column in said operative upstanding position;
   a latch pivotally mounted on said base structure and spring biased into engagement with said column;
   said latch having a platform engageable over a bracket extending from a side of said column to latch the latter in said operative upstanding position; and
   a detent extending from said bottom of the column, said latch engaging under said detent when said column is in said lateral inoperative position for releasably latching said column in said lateral inoperative position;
   whereby when said column is in said lateral inoperative position said portable radial arm saw is more compact for transporting and storing.

10. A portable radial arm saw, comprising:
a base frame having a rear and a front connected by two opposed sides;
a horizontal work surface above and supported by said base frame, said work surface comprising a front portion fixed to said base frame, and a removable rear portion adjacent the rear of said base frame;
a column having one end secured within a sleeve;
a first pivot plate rigidly secured to said sleeve;
a second pivot plate mounted on and behind the rear of said base frame;
said first and second pivot plates being pivotally connected for relative pivoting about a horizontal axis transverse to the rear of said base frame whereby said column is pivotally attached to said base frame, said column being pivotal between a vertical operative position in which the column extends upwardly above said work surface and a horizontal inoperative position in which the column extends along and behind the rear of said base frame;
means for locating said column in said vertical operative position;
means for releasably securing said column in said vertical operative position;
means for releasably securing said column in said horizontal inoperative position;
an arm extending horizontally from the other end of said column and having a circular saw unit slidably suspended therefrom, said saw unit including a circular saw blade and an electric motor;
said electric motor extending to one side of said saw unit transversely to said circular saw blade; said base frame having a space therein below said removable rear portion, said motor entering and being at least partially housed in said space when said rear portion of said work surface is removed and said column pivoted to said horizontal inoperative position; and
said arm being located along and outside one of said sides of said base frame when said column is in said horizontal inoperative position.

11. A portable radial arm saw, comprising:
a base structure having a rear, and feet for supporting the base structure on a bench top;
a horizontal work surface above and supported by said base structure, a rear portion of said work surface being removable;
said base structure having a space therein below said removable rear portion;
a column located behind and pivoted at one end to the rear of said base structure, and bein pivotal between a vertical operative position in which the column extends upwardly above said work surface and a horizontal inoperative position in which the column extends along and behind the rear of said work surface;
an arm extending horizontally from the other end of said column and extending over said work surface in said vertical operative position of said column;
said arm extending outside said work surface and along a side thereof in said horizontal inoperative position of said column;
a circular saw uhnit slidably suspended from said arm and including an electric motor, said electric motor extending to one side of said saw unit;
said motor entering and being housed in said space when said rear portion of said work surface is removed and said column pivoted to said horizontal inoperative position, said column and said arm both lying in the plane of said horizontal work surface in said horizontal inoperative position of the column;
means for releasably securing the column in said horizontal inoperative position; and
a handle connected to the portable radial arm saw by which the latter can be carried when said column is in said horizontal inoperative position.

12. A portable radial arm saw, comprising:
a base structure having a rear and feet for supporting the base structure on a bench top;
said feet being formed of firm resilient material;
a horizontal work surface above and supported by said base structure, a rear portion of said work surface being removable;
said base structure having a space therein below said removable rear portion;
a column located behind and pivoted at one end to the rear of said base structure, and being pivotal between a vertical operative position in which the column extends upwardly above said work surface and a horizontal inoperative position in which the column extends along and behind the rear of said work surface;
a socket in which said one end of said column is secured;
a first pivot plate mounted on said socket;
a second pivot plate mounted on the rear of said base structure;
a pivot pivotally connecting said first and second pivot plates whereby said column is pivoted to said base structure;
a bracket extending from one side of said socket;
a detent on the bottom of said socket;
a latch pivotally mounted at one end on the rear of said base structure and spring biased to pivot into contact with said socket;
said latch having a platform intermediate said one end of said latch and a free end of said latch, said platform engaging over said bracket to releasably secure said column in said vertical operative position and said free end of said latch engaging said detent to releasably secure said column in said horizontal inoperative position;
an arm extending horizontally from the other end of said column and extending over said work surface in said vertical operative position of said column;
said arm extending outside said work surface and along a side thereof in said horizontal inoperative position of said column;
a circular saw unit slidably suspended from said arm and including an electric motor, said electric motor extending to one side of said saw unit; and
said motor entering and being housed in said space when said rear portion of said work surface is removed and said column pivoted to said horizontal inoperative position, said column and said arm both lying approximately in the plane of said horizontal work surface in said horizontal inoperative position of the column.

13. The portable radial arm saw of claim 12, wherein said bracket has a bolt threaded therethrough and engageable with a second bracket extending rearwardly from the rear of said base structure for locating said column in said vertical operative position.

14. The portable radial arm saw of claim 12, wherein said platform is formed with a screw-threaded socket through which engages a screw having a manually operable knob at one end, the other end of said screw being threadedly engageable in said bracket for positively locking said latch to said bracket in the vertical operative position of said column.

* * * * *